US012076987B2

(12) United States Patent
Yasuda et al.

(10) Patent No.: US 12,076,987 B2
(45) Date of Patent: Sep. 3, 2024

(54) LIQUID EJECTION HEAD SUBSTRATE, LIQUID EJECTION HEAD, AND METHOD OF MANUFACTURING LIQUID EJECTION HEAD SUBSTRATE

(71) Applicant: CANON KABUSHIKI KAISHA, Tokyo (JP)

(72) Inventors: Takeru Yasuda, Kanagawa (JP); Koichi Omata, Kanagawa (JP); Yuzuru Ishida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 75 days.

(21) Appl. No.: 17/892,419

(22) Filed: Aug. 22, 2022

(65) Prior Publication Data

US 2023/0095423 A1 Mar. 30, 2023

(30) Foreign Application Priority Data

Sep. 29, 2021 (JP) ................................ 2021-159098

(51) Int. Cl.
*B41J 2/14* (2006.01)
*B41J 2/16* (2006.01)

(52) U.S. Cl.
CPC ......... *B41J 2/14129* (2013.01); *B41J 2/1631* (2013.01); *B41J 2202/16* (2013.01); *B41J 2202/22* (2013.01)

(58) Field of Classification Search
CPC .. B41J 2/14129; B41J 2/1631; B41J 2202/16; B41J 2202/22
See application file for complete search history.

(56) References Cited

U.S. PATENT DOCUMENTS

| | | | | |
|---|---|---|---|---|
| 7,950,769 | B2 | 5/2011 | Sakai et al. | |
| 8,123,330 | B2 | 2/2012 | Sakai et al. | |
| 8,491,087 | B2 | 7/2013 | Sakai et al. | |
| 9,061,489 | B2 | 6/2015 | Sakurai et al. | |
| 9,085,143 | B2 | 7/2015 | Ishida et al. | |
| 2007/0146428 | A1 | 6/2007 | Sakai et al. | |
| 2011/0199421 | A1 | 8/2011 | Sakai et al. | |
| 2012/0105537 | A1 | 5/2012 | Sakai et al. | |
| 2017/0057228 | A1* | 3/2017 | Oikawa | B41J 2/14129 |
| 2019/0001679 | A1* | 1/2019 | Aoki | B41J 2/1601 |
| 2022/0314619 | A1 | 10/2022 | Iwahashi et al. | |

FOREIGN PATENT DOCUMENTS

JP 2008-105364 A 5/2008

* cited by examiner

*Primary Examiner* — Henok D Legesse
(74) *Attorney, Agent, or Firm* — VENABLE LLP

(57) ABSTRACT

A liquid ejection head substrate includes a base layer, a heating resistance element provided over the base layer to generate a heat energy for ejecting a liquid, a first insulation layer covering the heating resistance element, and a protective layer having, on the first insulation layer, a first region which overlaps the heating resistance element via the first insulation layer and a second region which does not overlap the heating resistance element and formed of a material including a metal which is eluted by an electrochemical reaction. The liquid ejection head substrate further includes a second insulation layer provided over a region overlying the base layer and not provided with the protective layer and over the second region of the protective layer.

18 Claims, 7 Drawing Sheets

A-A CROSS SECTION 105
101
108
105
104

106
101
108
105
104

107
106
101
108
105
104

107
106
101
108
105
106
104

116
107
106
101
108
116
105
106
104

129
116
107
106
101
119
108
109
116
105
106
104

B-B CROSS SECTION

C-C CROSS SECTION

FIG. 7

| | CONDITION | Ar/CHLORINE FLOW RATE RATIO | SUBSTRATE BIAS POWER [W] | STATUS OF LIQUID EJECTION HEAD SUBSTRATE |
|---|---|---|---|---|
| FIRST EMBODIMENT<br>SECOND EMBODIMENT | 1 | 2／1 | 300 – 400 | INTENDED SHAPES WERE OBTAINED |
| COMPARATIVE EXAMPLE 3 | 2 | 4／1 | 300 – 400 | ETCHING HAD PROCEEDED TO ELECTRODE WIRING LAYER AND HEAT STORING LAYER UNDER INSULATING LAYER |
| COMPARATIVE EXAMPLE 4 | 3 | 2／1 | 500 – 600 | ETCHING HAD PROCEEDED TO ELECTRODE WIRING LAYER AND HEAT STORING LAYER UNDER INSULATING LAYER |
| COMPARATIVE EXAMPLE 5 | 4 | 1／1 | 300 – 400 | PROTECTIVE LAYER COULD NOT BE REMOVED COMPLETELY BY ETCHING |
| COMPARATIVE EXAMPLE 6 | 5 | 2／1 | 100 – 200 | PROTECTIVE LAYER COULD NOT BE REMOVED COMPLETELY BY ETCHING |

LIQUID EJECTION HEAD SUBSTRATE, LIQUID EJECTION HEAD, AND METHOD OF MANUFACTURING LIQUID EJECTION HEAD SUBSTRATE

BACKGROUND OF THE INVENTION

Field of the Invention

The present invention relates to a liquid ejection head substrate, a liquid ejection head, and a method of manufacturing the liquid ejection head substrate.

Description of the Related Art

In a liquid ejection apparatus represented by an ink jet printer, a liquid ejection head that ejects a liquid for recording to a recording medium typically has an element substrate provided with a plurality of ejection ports and with a heating resistance element connected to electric wiring. There has been known a method which uses such an element substrate serving as a liquid ejection head substrate to apply an electric current to the heating resistance element and generate heat, thereby causing film boiling in a liquid such as ink, and uses air bubbles generated at this time to cause the liquid to be ejected from the ejection ports and thus effect recording.

As an example of an element substrate as described above, there can be listed a configuration in which a cavitation resistant layer made of a high-hardness chemically stable material, such as Ir, is provided on an insulation layer such as a silicon nitride film to protect a heating resistance element. Meanwhile, heat generated from the heating resistance element causes a phenomenon in which, by a heat acting portion, a color material, an additive, and the like each included in a liquid such as ink are heated at a high temperature to be decomposed on a molecular level, changed to an insoluble substance, and physically adsorbed onto the cavitation resistant layer. This phenomenon is referred to as “kogation”, and the kogation may result in uneven heat conduction from the heat acting portion to the liquid and unstable foaming of the liquid.

Japanese Patent Application Publication No. 2008-105364 discloses a method for cleaning accumulated kogation in the process of sequential record processing. Specifically, using elution resulting from an electrochemical reaction caused by causing a cavitation resistant layer to serve as an electrode, the kogation accumulated on the cavitation resistant layer are removed.

SUMMARY OF THE INVENTION

When a kogation cleaning method as described above is used, every time a removing step is performed, the cavitation resistant layer is scraped and a layer thickness of the cavitation resistant layer is reduced. Accordingly, in terms of longer lives of an element substrate and a liquid ejection head, the cavitation resistant layer preferably has a larger layer thickness. On the other hand, for efficient transfer of heat from a heat generation layer to a liquid via an insulation layer located under the cavitation resistant layer in a heat acting portion, the insulation layer preferably has a smaller layer thickness.

Meanwhile, in manufacturing of the element substrate, when a physical etching effect such as that of reaction ion etching is used to etch the cavitation resistant layer in a region other than the heat acting portion, the insulation layer corresponding to a layer underlying the cavitation resistant layer is also simultaneously etched. When the insulation layer is scraped to have a smaller layer thickness, the insulation layer cannot satisfactorily function, which results in degradation of electric reliability and moisture resistance of the element substrate and degradation of reliability of the liquid ejection head. However, when the insulation layer is formed with a large layer thickness so as to remain with a sufficient layer thickness even after the etching, the insulation layer under the cavitation resistant layer also becomes thick, which leads to deterioration of heat conduction efficiency.

In view of the problems described above, an object of the present invention is to provide a liquid ejection head substrate with a longer life, while preventing heat conduction efficiency from deteriorating.

A liquid ejection head substrate of the present invention comprises:

- a base layer;
- a heating resistance element provided over the base layer to generate a heat energy for ejecting a liquid;
- a first insulation layer covering the heating resistance element; and
- a protective layer provided on the first insulation layer, having a first region which overlaps the heating resistance element via the first insulation layer and a second region which does not overlap the heating resistance element, the protective layer is formed of a material including a metal which is eluted by an electrochemical reaction,
- wherein the liquid ejection head substrate further comprises a second insulation layer provided over a region overlying the base layer where the protective layer is not provided and over the second region of the protective layer.

Also, a method of manufacturing a liquid ejection head substrate, wherein the liquid ejection head substrate comprising: a base layer; a heating resistance element; an electrode wiring layer; a first insulation layer; a protective layer; and a second insulation layer, the method of manufacturing the liquid ejection head substrate includes:

- a first step of providing, over the base layer, the heating resistance element that generates a heat energy for ejecting a liquid;
- a second step of stacking the first insulation layer over the heating resistance element;
- a third step of stacking, over the first insulation layer, the protective layer having a first region overlapping the heating resistance element via the first insulation layer and a second region not overlapping the heating resistance element and formed of a material including a metal which is eluted by an electrochemical reaction;
- a fourth step of partially removing the first insulation layer and the protective layer; and
- a fifth step of stacking the second insulation layer over a region overlying the base layer where the protective layer is not provided and over at least the second region of the protective layer.

According to the present invention, it is possible to provide a liquid ejection head substrate with a longer life, while preventing heat conduction efficiency from deteriorating.

Further features of the present invention will become apparent from the following description of exemplary embodiments with reference to the attached drawings.

BRIEF DESCRIPTION OF THE DRAWINGS

FIG. 7 is a table collectively illustrating etching conditions for protective layers and statuses of liquid ejection head substrates.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

The present invention relates to a liquid ejection head that ejects a liquid onto a recording medium to effect recording or the like and to a liquid ejection head substrate to be provided on the liquid ejection head. The present invention is favorably applied to, e.g., an ink jet head of an ink-jet recording type which uses heat energy to foam a liquid, such as ink, and effect recording. By way of example, the following will describe a case where the present invention is applied to the ink jet head, but the liquid ejection head of the present invention is not limited thereto and is applicable to various liquid ejection heads that use heat energy to eject liquids and to various liquid ejection head substrates.

1. FIRST EMBODIMENT

1.1 Configuration of Liquid Ejection Head Substrate

Figure 1A:
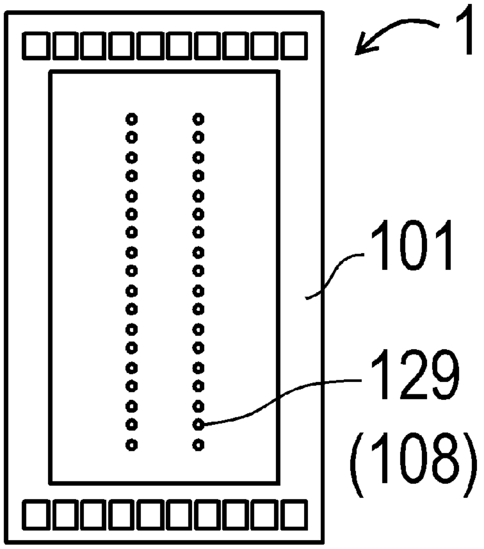
FIGS. 1A and 1B are plan views of a liquid ejection head substrate according to a first embodiment.
Figure 1B:
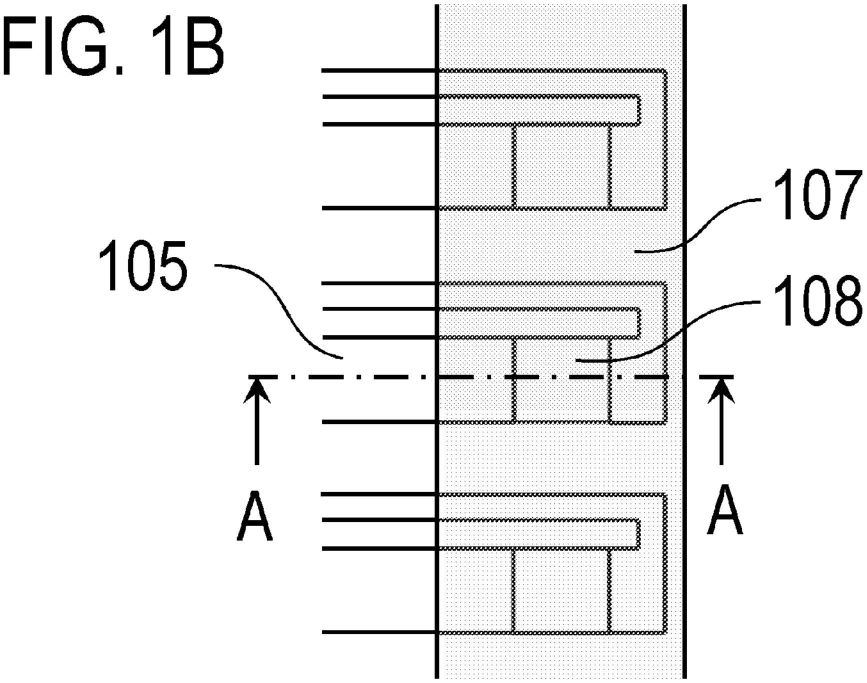
Figure 2:
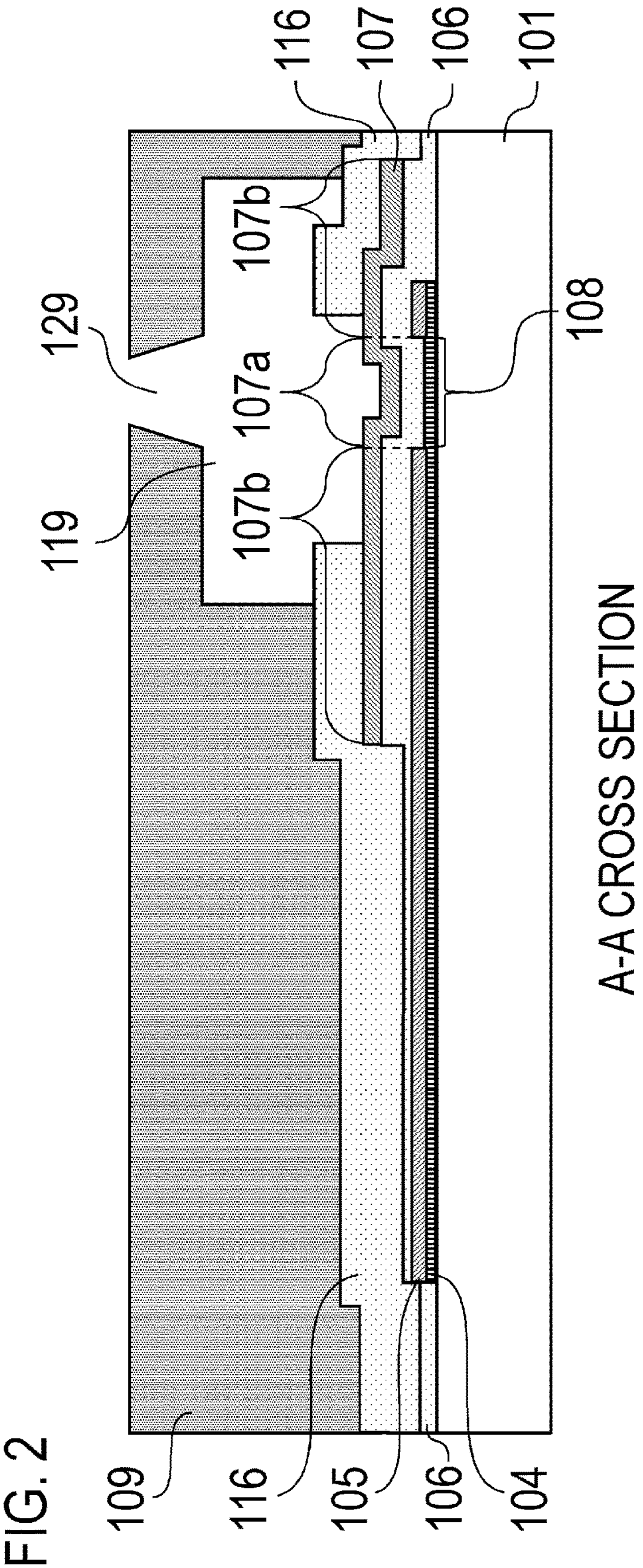
FIG. 2 is a cross-sectional view of the liquid ejection head substrate according to the first embodiment.

FIG. 1A is a plan view schematically illustrating a liquid ejection head substrate 11 according to a first embodiment. The liquid ejection head substrate 11 serving as an element substrate is provided with a plurality of ejection ports 129 and, at positions corresponding to the respective ejection ports 129, heating resistance elements 108 are provided to serve as heat acting portions. FIG. 1B is a plan view illustrating the vicinity of the heat acting portions in FIG. 1A in enlarged relation, and semi-translucently illustrates a protective layer 107, while hiding a flow path forming member 109 and the like, so as to show positional relationships between the heating resistance elements 108, an electrode wiring layer 105, and the protective layer 107. FIG. 2 is a schematic diagram illustrating a cross section along a line A-A in FIG. 1B and a layer configuration of the liquid ejection head substrate 11.

As illustrated in FIG. 2, in the liquid ejection head substrate 11, a plurality of layers formed of metal or the like are stacked on a base layer 101 formed of silicon. In the liquid ejection head substrate 11 of the first embodiment, a heat accumulation layer (not shown), a heating resistance element layer 104, the electrode wiring layer 105, a first insulation layer 106, a protective layer 107, a second insulation layer 116, and the flow path forming member 109 are formed in this order over the base layer 101.

The heat accumulation layer is formed of a thermal oxide film, a SiO film, a SiN film, or the like. The heating resistance element layer 104 is formed of tantalum silicon nitride or the like, and connected to the electrode wiring layer 105 to be electrically connected to the outside. The electrode wiring layer 105 functioning as wiring is formed of a metal material such as Al, Al—Si, or Al—Cu.

The heating resistance elements 108 each serving as a thermoelectric conversion element are formed through partial removal of the electrode wiring layer 105. In the first embodiment, the heating resistance element layer 104 and the electrode wiring layer 105 are disposed along a direction extending from liquid supply ports toward a liquid chamber to overlap each other so as to have outlines having the same shape. As a result of the partial removal of a part of the electrode wiring layer 105, a gap in which the electrode wiring layer 105 is not present is formed, and portions in which only the heating resistance element layer 104 is disposed are formed. The portions in which the heating resistance element layer 104 is exposed function as the heating resistance elements 108. The electrode wiring layer 105 is configured to be connected to a drive element circuit not shown and to external power source terminals so as to be able to receive a supply of electric power from the outside. In the configuration of the embodiment described above, the electrode wiring layer 105 is disposed over the heating resistance element layer 104, but the present invention is not limited thereto. Any configuration supplied with electric energy from the outside may be used instead. For example, it may also be possible to use a configuration in which the electrode wiring layer 105 is embedded in the heat accumulation layer (not shown), and electric power is supplied using metal plugs of tungsten or the like to the heating resistance elements 108 formed of the single layer over the heat accumulation layer.

The first insulation layer 106 is provided over the electrode wiring layer 105 so as to cover the heating resistance element layer 104 and the electrode wiring layer 105. The first insulation layer 106 is formed of a SiO film, a SiN film, a SiC film, a SiCN film, or the like. Heat from the heating resistance elements 108 is transferred via the first insulation layer 106 to the liquid. The first insulation layer 106 is required to have a given layer thickness so as to protect the electric wiring and the heating resistance elements and maintain insulation, but the first insulation layer 106 preferably has a layer thickness as small as possible to efficiently transfer an amount of heat from the heating resistance elements 108 to the liquid. In particular, the number of the ejection ports and a speed of ejection that have been increased in recent years have increased electric power consumed by the liquid ejection head and, to reduce the electric power consumed by the liquid ejection head, efficient transfer of the amount of heat from the heating resistance elements to the liquid is more important than ever.

The protective layer 107 is provided on the first insulation layer 106 and formed so as to cover the heating resistance elements 108 in order to protect respective surfaces of the heating resistance elements 108 from a chemical/physical shock resulting from heat generation from the heating resistance elements 108. In other words, the protective layer 107 is located so as to include a position directly behind each of the heating resistance elements 108 via the first insulation layer 106. The protective layer 107 in the first embodiment is formed of a platinum metal such as iridium (Ir) or ruthenium (Ru), and has electrical conductivity. When the liquid is ejected, an upper portion of the protective layer 107 comes into contact with the liquid. At the upper portion of the protective layer 107, a temperature of the liquid instantaneously rises to result in foaming of the liquid and subsequent defoaming thereof, which causes cavitation. As a result, the protective layer 107 is exposed to a severe environment. To prevent this, in the first embodiment, the protective layer 107 functioning as a cavitation resistant layer made of a material having high corrosion resistance and high reliability, such as Ir or Ru, is formed to protect the heating resistance element 108. In the first embodiment, the protective layer 107 includes a first region 107*a* overlapping the heating resistance element 108 via the first insulation layer 106 and a second region 107*b* located outside the first region 107*a* and not overlapping the heating resistance element 108.

As a result of performing an operation of cleaning the heat acting portion described later, the layer thickness of the protective layer 107 is reduced. When the cleaning is repeated to result a reduced layer thickness, the function of the cavitation resistant layer is lost to eventually lead to disconnection of the heating resistance element and possibly cause a failure of the head. In other words, cleaning resistance of the liquid ejection head substrate and the liquid ejection head is determined by an initial layer thickness of the protective layer 107. Therefore, for a longer life of the liquid ejection head, the layer thickness of the protective layer 107 is preferably maximized.

The second insulation layer 116 is formed partially over the second region 107*b* of the protective layer 107. The second insulation layer 116 is formed of the same material as that of the first insulation layer 106. In the first embodiment, the first insulation layer 106 and the second insulation layer 116 are formed of the same material, but may also be formed of different materials as long as a configuration capable of electrically insulating the electrode wiring layer 105 from the liquid filling the liquid chamber is used.

When the second insulation layer 116 is present in the heat acting portion over the first region 107*a*, efficiency of heat conduction from the heating resistance element 108 to the liquid deteriorates to increase an energy loss. Accordingly, the second insulation layer 116 in the first embodiment is formed so as not to cover the heating resistance element 108. Additionally, in the first embodiment, the portion from which the first insulation layer 106 has been removed is further covered with the second insulation layer 116 to provide a configuration which ensures the layer thicknesses of the insulation layers to enable reliable insulation. Accordingly, a total sum of the respective layer thicknesses of the first insulation layer 106 and the second insulation layer 116 in a region where the protective layer 107 is not provided is preferably set larger than the layer thickness of the first insulation layer 106 in a region where the protective layer 107 is provided.

The flow path forming member 109 is formed over the second insulation layer. By the flow path forming member 109, a flow path 119 for supplying the liquid from the liquid supply ports not shown and the ejection ports 129 for ejecting the liquid are formed. Between the flow path forming member 109 and the second insulation layer 116, a layer for improving adhesion between the flow path forming member 109 and the base layer 101 may also be formed. For the adhesion improving layer, a material such as SiO, SiCN, or SiOC is used appropriately. The adhesion improving layer functions as a surface protective layer and, by providing the adhesion improving layer, it is possible to allow the flow path forming member 109 to satisfactorily adhere to the second insulation layer 116.

In the first embodiment, for the cleaning operation of removing a deposit from over the heat acting portion, an electrochemical reaction between the protective layer 107 and ink is used. Accordingly, in the first insulation layer 106, a through hole (not shown) is formed to electrically connect the protective layer 107 to the electrode wiring layer 105. The electrode wiring layer 105 is connected to an external electrode through a relay wiring portion, and the protective layer 107 is also electrically connected to the external electrode via the electrode wiring layer 105.

The protective layer 107 in the first embodiment is further divided into two regions, i.e., the region formed over the heating resistance element 108 and including the heat acting portion and the other region (not shown) on an opposite electrode side, which are individually electrically connected. When there is no solution over the substrate, the two regions described above are not electrically connected to each other. However, when a space over the substrate is filled with a liquid including an electrolyte such as ink, an electric current flows via the solution to cause an electrochemical reaction at an interface between the protective layer 107 and the liquid. Ink to be used for ink-jet recording includes an electrolyte and, since Ir is used for the protective layer 107 in the first embodiment, as long as there is ink, it is possible to cause an electrochemical reaction and elution. At this time, the elution of metal occurs on an anode electrode side and, accordingly, to remove kogation from over the heating resistance element, it is only required to appropriately select an anode side and a cathode side and apply a potential thereto.

Note that, in the first embodiment, Ir is used for the protective layer 107, but another material may also be used instead as long as the material includes a metal to be eluted by an electrochemical reaction and does not form, as a result of being heated, an oxide film that prevents the elution. Note that the material mentioned herein which does not form, as a result of being heated, an oxide film that prevents the elution does not mean a material which forms no oxide film at all, but means a material which may form an oxide film as a result of being heated, but only to a degree that the formed oxide film does not prevent the elution. In the case of an Ir alloy or a Ru alloy, the degree to which the oxide film is formed tends to decrease as a content of Ir or Ru is higher. Therefore, a composition of the metal forming the protective layer 107 can be selected on the basis of the tendency of the degree to which the oxide film is formed, durability required of the meal, or the like.

1.2 Steps of Manufacturing Liquid Ejection Head Substrate 11

Referring to FIGS. 3A to 3F, a description will be given of steps of manufacturing the liquid ejection head substrate 11 according to the first embodiment. FIGS. 3A to 3F are schematic cross-sectional views illustrating a process of manufacturing the liquid ejection head substrate 11 according to the first embodiment. In the steps of manufacturing the liquid ejection head substrate 11, over the base layer 101 formed of Si, the individual layers are stacked in a state where a drive circuit has preliminarily been formed in the base layer 101. In the first embodiment also, semiconductor elements such as a switching transistor for selectively driving the heating resistance elements 108 or the like are preliminarily formed as the drive circuit in the base layer 101. Over the semiconductor elements or the like, the individual layers are stacked to form the liquid ejection head substrate 11. In FIGS. 3A to 3F, for the sake of simpler illustration, the drive circuit disposed in advance or the like is omitted from the illustration.

First, on the base layer 101, the heat accumulation layer (not shown) made of a $SiO_2$ thermal oxide film is formed as a layer underlying the heating resistance element layer 104 by a thermal oxidation method, a sputtering method, a CVD method, or the like. Note that, into a substrate in which the drive circuit has been formed in advance, the heat accumulation layer can also be formed in a process of producing the drive circuit.

Figures 3A, 3B, 3C, 3D, 3E, 3F:
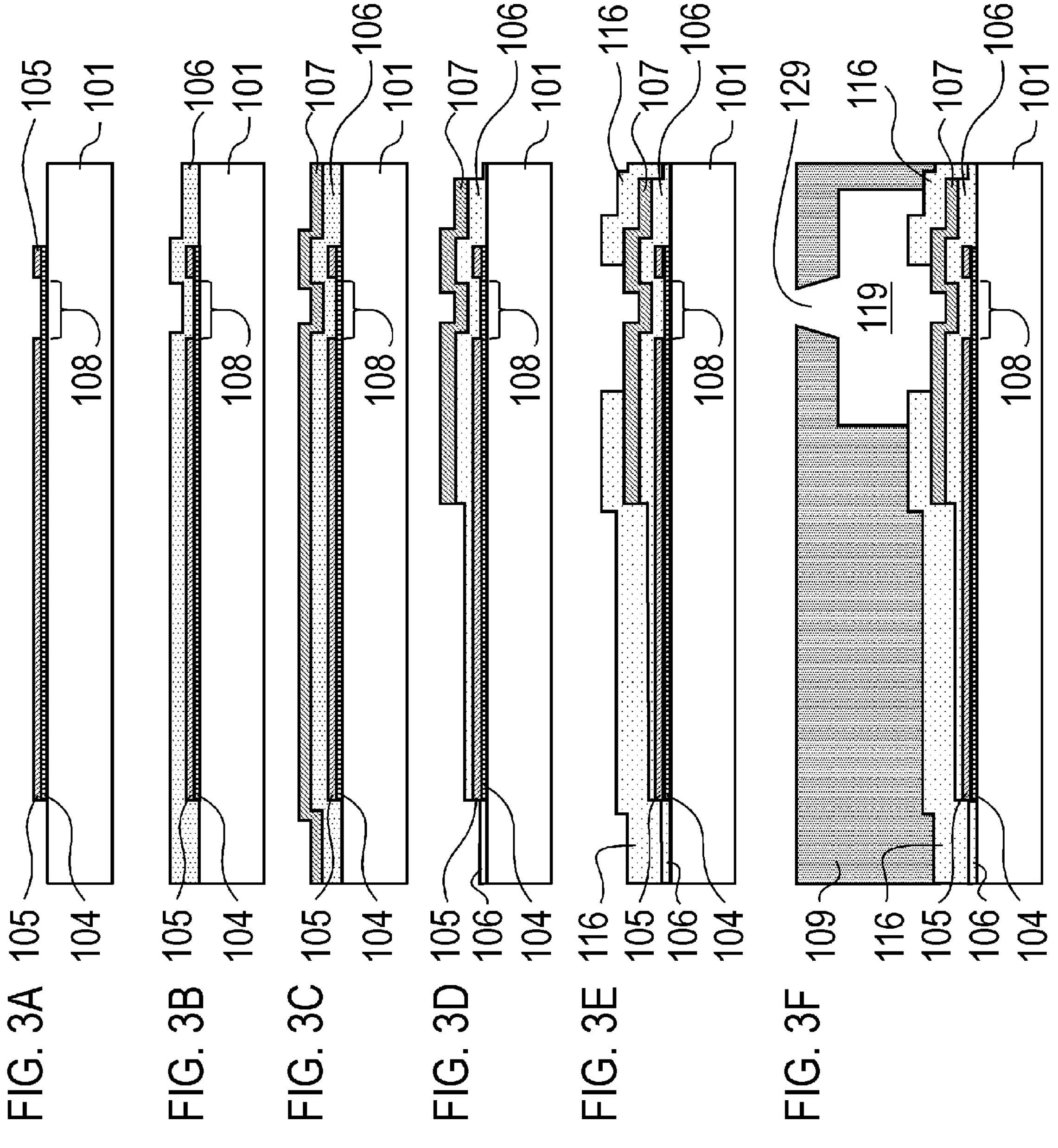
FIGS. 3A to 3F are cross-sectional views illustrating steps of manufacturing the liquid ejection head substrate according to the first embodiment.
Figure 6A:
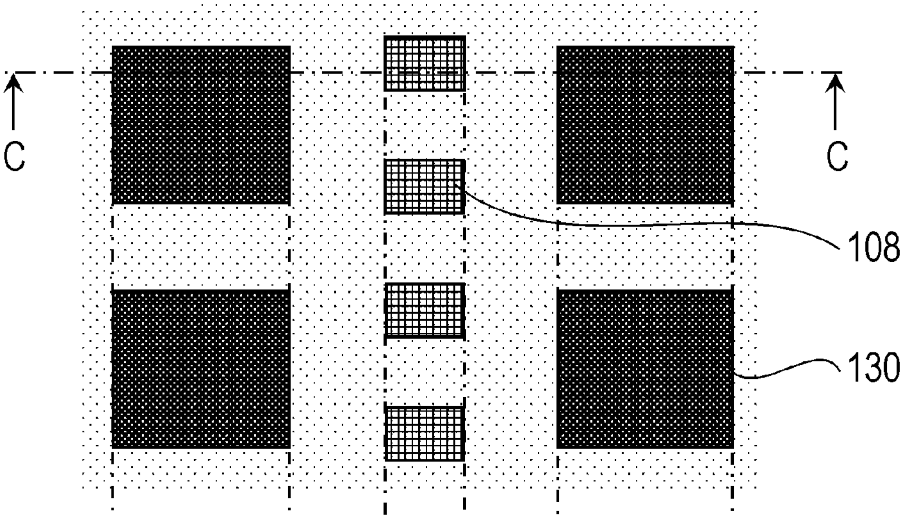
FIGS. 6A and 6B are a plan view and a cross-sectional view of a liquid ejection head substrate according to a third embodiment.

FIG. 3A illustrates, as a first step, the step of forming the heating resistance element layer 104 and the electrode wiring layer 105 over the base layer 101. The heating resistance element layer 104 made of TaSiN or the like is formed on the heat accumulation layer by reactive sputtering to have a thickness of about 20 nm. The electrode wiring layer 105 made of an Al layer is formed on the heating resistance element layer 104 by sputtering to have a thickness of about 300 nm. Then, using a photolithographic method, simultaneous dry etching is performed on the heating resistance element layer 104 and the electrode wiring layer 105 to provide a predetermined shape. Note that, in the first embodiment, a reactive ion etching (RIE) method is used as the dry etching. Then, using the photolithographic method again, only portions of the electrode wiring layer 105 serving as the heating resistance elements 108 are removed by a wet etching method using a mixed acid or the like. By the foregoing steps, the heating resistance element layer 104 and the electrode wiring layer 105 each having the shape illustrated in FIG. 6A are formed to provide the heating resistance elements 108.

FIG. 3B illustrates, as a second step, the step of forming a SiN film serving as the first insulation layer 106 on the electrode wiring layer 105. The SiN film is formed by a plasma CVD method to have a thickness of about 200 nm.

FIG. 3C illustrates, as a third step, the step of forming a layer including Ir and serving as the protective layer 107 on the first insulation layer 106 such that the heating resistance elements 108 are covered therewith. The layer formed of Ir is formed by a sputtering method to have a thickness of about 150 nm.

FIG. 3D illustrates, as a fourth step, the step of partially removing the first insulation layer 106 and the protective layer 107 to provide a predetermined shape. A material such as Ir is generally known as a difficult-to-etch material, and it is not easy to provide an intended shape only by dry etching. Accordingly, reactive ion etching (RIE) using Ar ions or the like is used to allow a physical etching effect to be used.

A detailed description will be given of a method of removing the first insulation layer 106 and the protective layer 107. First, using a photolithographic method, the layer formed of Ir is partially removed by dry etching. Then, using the RIE method, etching is performed with physical components. Details of etching conditions will be described later, and a selection ratio to SiN is about 1.0. Accordingly, to reliably form a pattern of the protective layer 107, 100% over-etching is performed. By the over-etching, the first insulation layer 106 is etched to have a thickness of about 150 nm substantially equal to that of the protective layer 107. Specifically, in a region where the protective layer 107 is not provided, the first insulation layer 106 remains with a layer thickness of about 50 nm on the base layer. With an etching method using a physical effect, when, e.g., a silicon nitride film or the like is present as an underlying insulation layer, it is difficult to ensure a selection ratio. In particular, when the protective layer 107 serving as the cavitation resistant layer is provided with a large layer thickness as in the first embodiment, the layer thickness of the underlying first insulation layer 106 is reduced to be smaller than necessary, and accordingly it is required to set appropriate conditions.

Etching conditions applied to the dry etching described above are shown herein. As a process gas to be used for the etching, Ar and chlorine were used at an approximately 2:1 flow rate ratio. In addition, to accelerate physical etching using Ar atoms, a bias to be applied to the substrate was set to fall within a range of 300 W to 400 W.

FIG. 3E illustrates, as a fifth step, the step of forming a SiN film serving as the second insulation layer 116 on the protective layer 107 and illustrates, as a sixth step, the step of partially removing the second insulation layer 116. First, using a plasma CVD method, the SiN film is formed as the second insulation layer 116 to have a thickness of about 200 nm. Then, using a photolithographic method and a chemical dry etching method, the second insulation layer 116 located directly behind the heating resistance element 108 is removed via the first insulation layer 106 and the protective layer 107 to open the heat acting portion.

FIG. 3F illustrates the step of forming the flow path forming member 109. Onto the liquid ejection head substrate 11 in which a film including the individual layers described above is formed over the base layer 101, a resist serving as a soluble solid layer, which eventually serves as the liquid chamber, is applied by a spin-coat method. A resist material is made of, e.g., polymethyl isopropenyl ketone to serve as a negative resist. Then, using a photolithographic technique, the resist layer is patterned into an intended shape of the liquid chamber. Subsequently, to form a liquid flow path wall forming the flow path 119 and the ejection ports 129, a coating resin layer is formed. Before the coating resin layer is formed, to improve adhesion, a silane coupling treatment or the like can be performed appropriately. The coating resin layer can be formed by appropriately selecting a conventionally known coating method and applying a resin onto the base layer of the liquid ejection head substrate formed with a liquid chamber pattern of the liquid chamber. Then, using a photolithographic technique, the coating resin layer is patterned into intended shapes of the liquid flow path wall and the ejection ports.

After the formation of the flow path forming member 109, using an anisotropic etching method, a sand blast method, an anisotropic plasma etching method, or the like, the liquid supply ports (not shown) are formed in a back surface (side of the base layer 101 not provided with the various layers) of the substrate. Most preferably, the liquid supply ports can be formed by a chemical silicon anisotropic etching method using tetramethylhydroxyamine (TMAH), NaOH, KOH, or the like. Subsequently, using Deep-UV light, full exposure is performed to effect development and drying, thereby removing the soluble solid layer. Through the foregoing steps, the liquid ejection head substrate 11 is manufactured.

In the configuration according to the embodiment described above, even when a platinum metal material, which is a difficult-to-etch material such as Ir, is used for the protective layer 107 and then the layer thickness of the protective layer 107 is increased to improve durability, the layer thickness of the first insulation layer 106 disposed in the heat acting portion can be reduced to a minimum required value. In other words, it is possible to manufacture the liquid ejection head substrate 11 with improved cleaning resistance without degrading heat efficiency.

1.3 Ink Jet Head

Figure 4:
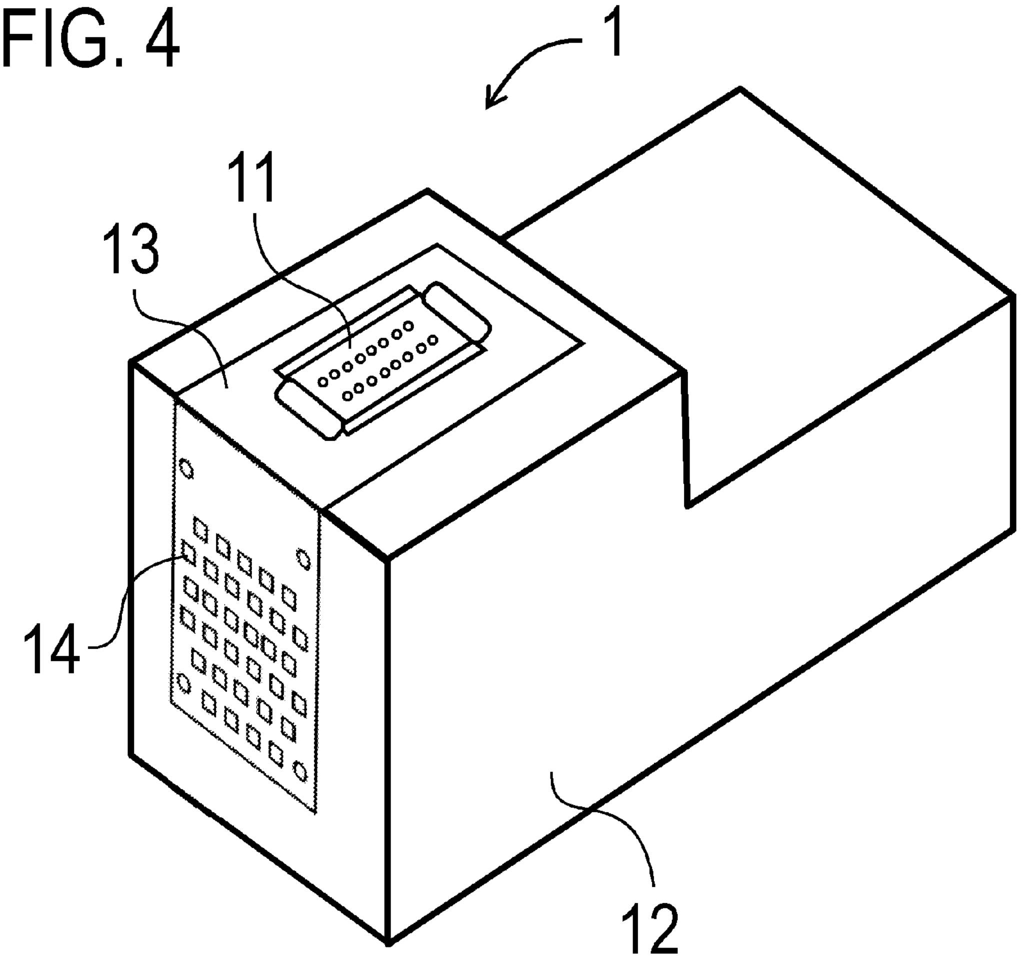
FIG. 4 is a perspective view of the liquid ejection head according to the first embodiment.

FIG. 4 illustrates an example of a configuration of an ink jet head 1 serving as a liquid ejection head on which the liquid ejection head substrate 11 described above is to be provided. The ink jet head 1 includes the liquid ejection head substrate 11, an ink tank 12 serving as a casing, TAB (Tape Automated Bonding) 13 serving as the relay wiring portion, and contact points 14. In the ink tank 12, ink to be ejected via the liquid ejection head substrate 11 is stored. The contact points 14 come into contact with electric output terminals of a main body of a liquid ejection apparatus such as an ink jet printer to receive electric power. The electric power supplied to the contact points 14 is transferred to the liquid ejection head substrate 11 via the TAB 13.

Note that the ink jet head is not limited to that applied to a form integrated with an ink tank as described above. For example, it may also be possible to configure the ink jet head such that the ink tank is removably attached thereto and, when an amount of the ink remaining in the ink tank becomes zero, the ink tank is removed and a new ink tank is attached to the ink jet head. Alternatively, it may also be possible to configure the ink jet head separate from the ink tank, and the ink is supplied thereto via a tube or the like. Still alternatively, it may also be possible to use an ink jet head applied to such a serial recording method as to be described or an ink jet head having nozzles over a range corresponding to an entire width of a recording medium, such as that applied to a line printer.

1.4 Evaluation of Cleaning Resistance

Using the ink jet head 1 on which the liquid ejection head substrate 11 according to the first embodiment was mounted, cleaning of the heat acting portion was repeatedly performed, and the cleaning resistance and the like were evaluated. In the cleaning evaluation, to verify effects of the present invention, a plurality of substrates serving as Comparative Examples were produced and similarly evaluated. Configurations of Comparative Examples will be described later.

As a result of repeatedly performing a cleaning operation by using the ink jet head 1 on which the liquid ejection head substrate 11 according to the first embodiment was mounted, it was recognized that, even after the cleaning operation was performed 90 times, the protective layer 107 remained.

As Comparative Example 1, the substrate was produced to have a configuration not provided with the second insulation layer 116, in contrast to the substrate of the first embodiment. In other words, Comparative Example 1 is different from the first embodiment only in that the second insulation layer 116 is not provided.

As a result of using a liquid ejection head on which the substrate of Comparative Example 1 was mounted, an ink jet head could not be driven. This may be conceivably because, as a result of removal of a considerable amount of the first insulation layer 106 by over-etching, insulation of the electrode wiring layer 105 that should originally have been electrically insulated could not be maintained, and a leakage occurred.

As Comparative Example 2, a substrate was produced to have a configuration in which the layer thickness of the protective layer 107 was set to 45% of the layer thickness of the first insulation layer 106, in contrast to the substrate of Comparative Example 1. In other words, Comparative Example 2 is different from the first embodiment in that the second insulation layer 116 was not provided, and the layer thickness of the protective layer 107 was changed from 150 nm to 90 nm.

As a result of using a liquid ejection head on which the substrate of Comparative Example 2 was mounted, unlike in Comparative Example 1, the liquid ejection head was driven. This may be conceivably because, since the layer thickness of the protective layer 107 in Comparative Example 2 was smaller than those in the first embodiment and Comparative Example 1, the thickness of the first insulation layer 106 to be removed by over-etching was also reduced, and the thickness of the remaining first insulation layer 106 was increased. As a result of repeatedly performing a cleaning operation by using the substrate of Comparative Example 2, after the cleaning operation was performed about 50 times, it was recognized that the protective layer 107 disappeared, and some of the heating resistance elements were broken. In other words, it was confirmed that, when an initial layer thickness of the protective layer 107 was reduced in order to reduce the thickness of the first insulation layer 106 to be removed by etching, the resistance to cleaning deteriorated. In terms of the cleaning resistance, the layer thickness of the protective layer 107 is preferably provided to be 50% or more of the layer thickness of the first insulation layer 106, or more preferably at least 100 nm or more.

As described above, in the configuration in which only the first insulation layer 106 and the protective layer 107 are provided, when the initial layer thickness of the first insulation layer 106 is reduced and the initial layer thickness of the protective layer 107 is increased, the first insulation layer 106 does not remain, and the insulation cannot be maintained. Meanwhile, when the initial layer thicknesses of both of the first insulation layer 106 and the protective layer 107 are reduced, the cleaning resistance is not satisfactory. Conversely, when the initial layer thicknesses of both of the first insulation layer 106 and the protective layer 107 are increased, heat conductivity efficiency deteriorates. In other words, while the cleaning resistance and the heat conductivity efficiency of the heat acting portion have a trade-off relationship therebetween in the conventional configuration, by applying the present invention to the conventional configuration, it is possible to improve the cleaning resistance and elongate the life of the liquid ejection head substrate without entailing the deterioration of the heat conductivity efficiency.

2. SECOND EMBODIMENT

As a second embodiment, a configuration obtained by modifying the layer configuration in the first embodiment will be described. In the second embodiment, the electrode wiring layer is embedded in a heat accumulation layer 102. Other components similar to those in the first embodiment are denoted by the same reference numerals, and a description thereof is omitted.

2.1 Configuration of Liquid Ejection Head Substrate 11

Figure 5A:
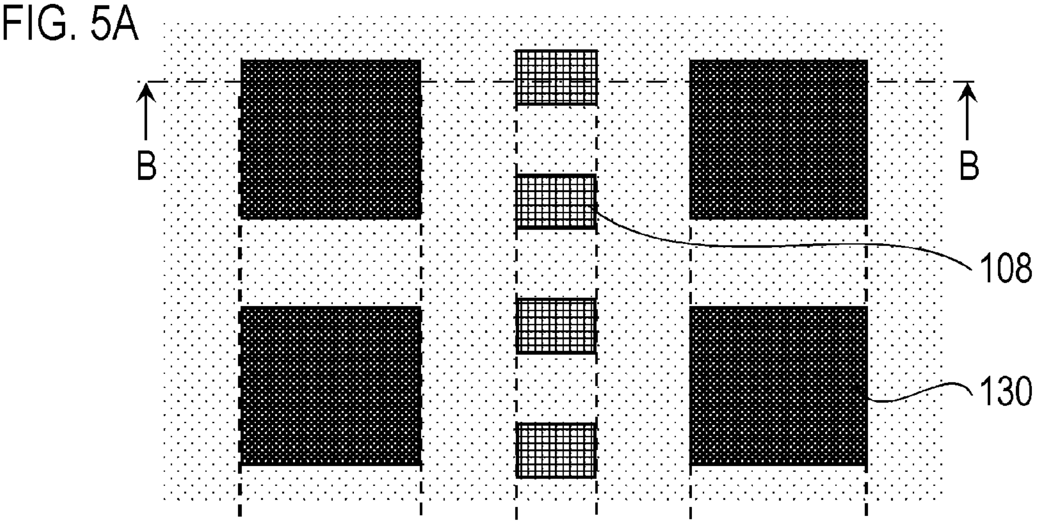
FIGS. 5A and 5B are a plan view and a cross-sectional view of a liquid ejection head substrate according to a second embodiment.
Figure 5B:
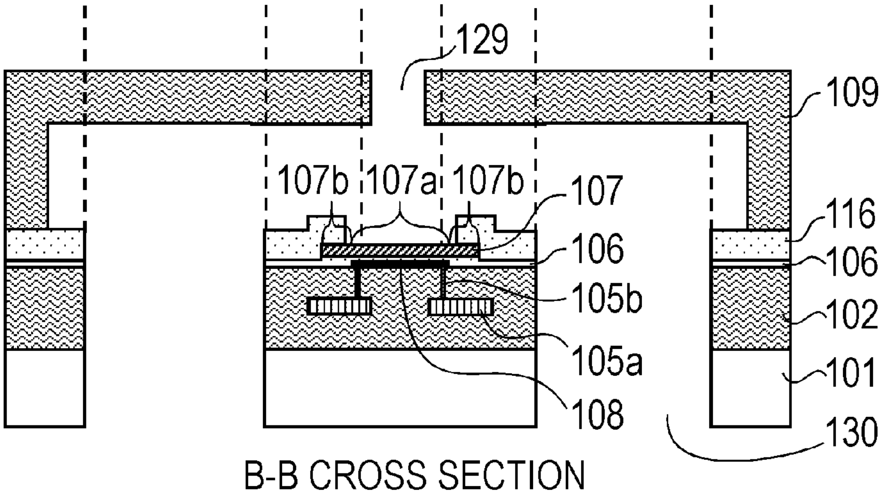

FIG. 5A is a schematic plan view illustrating, in enlarged relation, the vicinity of the heat acting portion of the liquid ejection head substrate 11 according to the second embodiment of the present invention, which does not illustrate the flow path forming member 109 for simpler illustration, but illustrates a positional relationship between the heating resistance elements 108 and liquid supply ports 130. FIG. 5B is a schematic diagram illustrating a cross section along a line B-B in FIG. 5A.

In the liquid ejection head substrate 11 according to the second embodiment also, a plurality of layers are formed to be stacked on the base layer 101 formed of silicon. On the base layer 101, the heat accumulation layer 102 formed of a thermal oxide film, a SiO film, a SiN film, or the like is disposed and, on the heat accumulation layer 102, the heating resistance elements 108 are disposed. The heating resistance elements 108 are electrically connected to the outside via electrode wiring layers 105*a* functioning as wiring made of a metal material such as Al, Al—Si, or Al—Cu and connection plugs 105*b*. Over the heating resistance elements 108 and the heat accumulation layer 102, the first insulation layer 106 is disposed.

In the second embodiment, the electrode wiring layers 105*a* are configured to be connected to the drive element circuit and the external power source terminals each not shown so as to be able to receive a supply of electric power from the outside. In the second embodiment, the electrode wiring layers 105*a* to which electric energy is supplied from the outside are embedded in the heat accumulation layer 102 and, using the connection plugs 105*b* formed of a material such as tungsten, the electric power is supplied to the heating resistance elements 108 formed of the single layer over the heat accumulation layer 102. As described previously, the second embodiment is different from the first embodiment in positions at which the electrode wiring layers are disposed.

In the liquid chamber, the first insulation layer 106 and the protective layer 107 are provided over the heat accumulation layer 102 so as to cover the heating resistance elements 108, and the second insulation layer 116 is further provided over the second region 107*b* of the protective layer 107. For the first insulation layer 106 and the second insulation layer 116, a material capable of insulation such as a SiO film, a SiN film, a SiC film, or a SiCN film is used appropriately. In the second embodiment, the same material is used for each of the layers, but different materials may also be used instead. For the protective layer 107, a platinum metal material such as iridium (Ir) or ruthenium (Ru) is used appropriately.

In the second embodiment also, to remove a deposit from over the heat acting portion, through holes (not shown) are formed in the first insulation layer 106 to electrically connect the protective layer 107 and the electrode wiring layers 105*a* and thereby allow an electrochemical reaction between the protective layer 107 and ink to be used. Alternatively, for the protective layer 107, a material other than those mentioned above may also be used as long as the material includes a metal which is eluted by the electrochemical reaction and does not form, as a result of being heated, an oxide film that prevents the elution. A composition of the metal forming the protective layer 107 can be selected on the basis of a state of formation of an oxide film, durability required of the metal, or the like.

2.2 Steps of Manufacturing Liquid Ejection Head Substrate 11

A description will be given of steps of manufacturing the liquid ejection head substrate 11 according to the second embodiment. Note that, in general, in steps of manufacturing a liquid ejection head, over the base layer 101 formed of Si, the various layers are stacked in a state where a drive circuit has preliminarily been formed in the base layer 101 to manufacture the ink jet head 1. In the second embodiment also, semiconductor elements such as a switching transistor for selectively driving the heating resistance elements 108 and the like are preliminarily formed as the drive circuit in the base layer 101, and the individual layers are stacked thereover to form the liquid ejection head substrate 11.

First, on the base layer, the heat accumulation layer 102 made of a $SiO_2$ thermal oxide film is formed as a layer underlying the heating resistance elements 108 by a thermal oxidation method, a sputtering method, a CVD method, or the like. Note that, into a substrate in which the drive circuit has been formed in advance, the heat accumulation layer can be formed in a process of producing the drive circuit. In the second embodiment, during the formation of the heat accumulation layer, the electrode wiring layers 105*a* are embedded in the heat accumulation layer 102, and the connection plugs 105*b* are formed to connect the electrode wiring layers 105*a* to the heating resistance elements 108.

Then, to form the first insulation layer 106, using a plasma CVD method, a SiN film is formed as the first insulation layer 106 to have a thickness of about 300 nm. As the protective layer 107, on the first insulation layer, a layer is further formed of Ir by a sputtering method to have a thickness of about 300 nm. Then, using a photolithographic method, the layer formed of Ir is partially removed by dry etching. At this time, the protective layer 107 is formed but, since Ir is a chemically stable material, it is necessary in the dry etching to use a RIE method and perform etching with physical components. Etching conditions will be shown later but, since a selection ratio to SiN is about 1.0, to reliably form a pattern of the protective layer 107, 90% over-etching was performed. At this time, the first insulation layer 106 was etched by about 270 nm by the over-etching.

Etching conditions applied to the dry etching described above are shown herein. As a process gas to be used for the etching, Ar and chlorine were used at an approximately 2:1 flow rate ratio. In addition, to accelerate physical etching using Ar atoms, a bias to be applied to the substrate was set to fall within a range of 300 W to 400 W.

Then, using a plasma CVD method, a SiN film is formed as the second insulation layer 116 to have a thickness of about 200 nm. Then, using a photolithographic method and a chemical dry etching method, the second insulation layer 116 located directly behind the heating resistance elements 108 is removed via the first insulation layer 106 and the protective layer 107 to open the heat acting portion.

Finally, to produce the liquid chamber and the liquid flow path, the flow path forming member 109 is formed, and an anisotropic etching method or the like is implemented on the back surface of the substrate to form the liquid supply ports 130. Through the foregoing steps, the liquid ejection head substrate 11 is manufactured.

In the configuration according to the embodiment described above, even when a platinum metal material as a difficult-to-etch material, such as Ir, is used for the protective layer 107 and then the layer thickness of the protective layer 107 is increased to improve durability, the layer thickness of the first insulation layer 106 disposed in the heat acting portion can be reduced to a minimum required value. In other words, it is possible to produce the liquid ejection head substrate 11 with improved cleaning resistance without degrading heat efficiency.

2.3 Evaluation of Cleaning Resistance

Using an ink jet head on which the liquid ejection head substrate 11 according to the second embodiment was mounted, the same cleaning evaluation as performed in the first embodiment was performed. As a result of repeatedly performing the cleaning of the heat acting portion, it was recognized in the same manner as in the first embodiment that, even after the cleaning was repeated 90 times, the protective layer 107 remained.

3. THIRD EMBODIMENT

As a third embodiment, a configuration obtained by modifying the layer configuration in the second embodiment will be described. In a configuration of the third embodiment, the first insulation layer 106 is not left in a region where the protective layer 107 is not present. Other components similar to those in the second embodiment are denoted by the same reference numerals, and a description thereof is omitted.

3.1 Configuration of Liquid Ejection Head Substrate 11

Figure 6B:
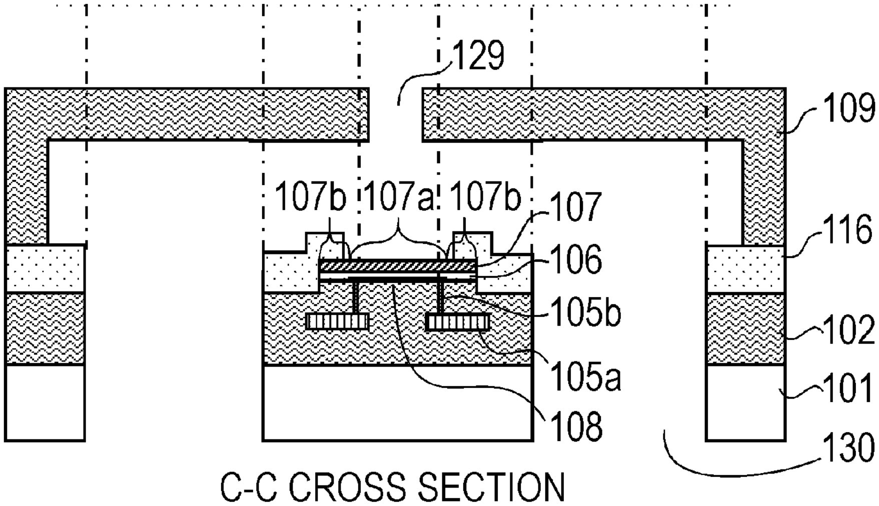

FIG. 6A is a schematic plan view illustrating, in enlarged relation, the vicinity of the heat acting portion of the liquid ejection head substrate 11 according to the third embodiment of the present invention, which illustrates a positional relationship between the heating resistance elements 108 and the liquid supply ports 130 and from which the flow path forming member 109 is removed. FIG. 6B is a schematic diagram illustrating a cross section along a line C-C in FIG. 6A.

In the third embodiment, the substrate is configured such that the first insulation layer 106 is not present in a region where the protective layer 107 is not present, in contrast to the substrate shown in the second embodiment. In a case of using the configuration in which the electrode wiring layers 105*a* are embedded in the heat accumulation layer 102 and are not present immediately below the first insulation layer 106 as in the third embodiment, there is no need to control a thickness of the remaining first insulation layer 106, and therefore the flexibility of selecting the manufacturing steps is improved.

3.2 Steps of Manufacturing Liquid Ejection Head Substrate 11

In manufacturing steps in the third embodiment, to more reliably remove the protective layer 107, an over-etching rate in the dry etching step when the protective layer 107 is formed is increased to 120%. As a result, even the first insulation layer 106 having an initial layer thickness approximately equal to that of the protective layer 107 does not remain in the region from which the protective layer 107 is removed, and is completely removed. The other manufacturing steps are the same as those in the second embodiment.

In the configuration according to the embodiment described above, even when a platinum metal material as a difficult-to-etch material, such as Ir, is used for the protective layer 107 and then the layer thickness of the protective layer 107 is increased to improve durability, the layer thickness of the first insulation layer 106 disposed in the heat acting portion can be reduced to a minimum required value. In other words, it is possible to produce the liquid ejection head substrate 11 with improved cleaning resistance without degrading heat efficiency.

3.3 Evaluation of Cleaning Resistance

Using an ink jet head on which the liquid ejection head substrate 11 according to the third embodiment was mounted, the same cleaning evaluation as performed in the first embodiment and the second embodiment was performed. In the third embodiment, the first insulation layer 106 was not left in the region where the protective layer 107 was not provided. However, since the electrode wiring layers 105*a* were embedded in the heat accumulation layer 102 and were not removed by etching, the ink jet head was driven without problems. As a result of repeatedly performing the cleaning of the heat acting portion, it was recognized in the same manner as in the first embodiment and the second embodiment that, even after the cleaning was repeated 90 times, the protective layer 107 remained.

4. OTHER COMPARATIVE EXAMPLES

To confirm effects given by etching conditions for the protective layer 107 to drivability of the liquid ejection head, Comparative Examples were produced by varying the etching conditions in the first embodiment or in the second embodiment.

4.1 Comparative Examples 3 and 4

By varying the etching conditions for the protective layer 107 in the first embodiment, liquid ejection head substrates and ink jet heads were produced, and statuses of the liquid ejection head substrates were checked. FIG. 7 illustrates, in the form of a table, a list of etching conditions used in Comparative Examples 3 and 4 and the statuses of the produced liquid ejection head substrates 11.

As Comparative Example 3, the Ar/chlorine flow rate ratio of the process gas was changed to 4:1, and etching was performed (Condition 2). As Comparative Example 4, the range of a bias to be applied to the substrate was changed to a range of 500 W to 600 W, and etching was performed (Condition 3). In each of the substrates, the etching had proceeded to the electrode wiring layers and the heat accumulation layer under the first insulation layer 106 and, in the same manner as in Comparative Example 1, the liquid ejection head could not be driven. In other words, it was successfully confirmed that, in the configuration in which the wiring layer was provided immediately below the insulation layer, the insulation layer that was left instead of being completely removed to prevent the electrode wiring layers from being removed during the etching of the protective layer was required to drive the liquid ejection head.

4.2 Comparative Examples 5 and 6

By varying the etching conditions for the protective layer 107 in the second embodiment, liquid ejection heads were produced, and statuses of the liquid ejection head substrates were checked. FIG. 7 illustrates, in the form of a table, a list of etching conditions used in Comparative Examples 5 and 6 and the statuses of the produced liquid ejection head substrates 11.

As Comparative Example 5, the Ar/chlorine flow rate ratio of the process gas was changed to 1:1, and etching was performed (Condition 4). As Comparative Example 6, the range of a bias to be supplied to the substrate was changed to a range of 100 W to 200 W, and etching was performed (Condition 5). In each of the substrates, the protective layer 107 was not satisfactorily etched and, in the same manner as in Comparative Example 1, the liquid ejection head could not be driven. In other words, it was successfully confirmed that, in the step of removing the protective layer by etching, selection of conditions that can ensure complete removal of the protective layer was required to drive the liquid ejection head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-159098, filed on Sep. 29, 2021, which is hereby incorporated by reference herein in its entirety.

What is claimed is:

1. A liquid ejection head substrate comprising:

a base layer;

a heating resistance element provided over the base layer to generate a heat energy for ejecting a liquid;

a first insulation layer covering the heating resistance element; and a protective layer provided on the first insulation layer, having a first region which overlaps the heating resistance element via the first insulation layer and a second region which does not overlap the heating resistance element, the protective layer is formed of a material including a metal which is eluted by an electrochemical reaction, wherein the liquid ejection head substrate further comprises a second insulation layer provided over a region overlying the base layer where the protective layer is not provided and over the second region of the protective layer, and wherein a layer thickness of the first insulation layer in a region uncovered with the protective layer is smaller than a layer thickness of the first insulation layer in a region covered with the protective layer.

2. The liquid ejection head substrate according to claim 1, wherein the protective layer is formed of a material which does not form, as a result of being heated, an oxide film that prevents an elution.

3. The liquid ejection head substrate according to claim 1, wherein the protective layer is formed of a material including iridium or ruthenium.

4. The liquid ejection head substrate according to claim 1, wherein a layer thickness of the protective layer is not less than 50% of a layer thickness of the first insulation layer located immediately below the protective layer.

5. The liquid ejection head substrate according to claim 1, wherein a layer thickness of the protective layer is not less than 100 nm.

6. The liquid ejection head substrate according to claim 1, wherein a total sum of respective layer thicknesses of the first insulation layer and the second insulation layer in a region uncovered with the protective layer is larger than a layer thickness of the first insulation layer in a region where the first insulation layer is covered with the protective layer.

7. The liquid ejection head substrate according to claim 1, wherein the second insulation layer is not provided over the first region of the protective layer.

8. The liquid ejection head substrate according to claim 1, wherein the liquid ejection head substrate further comprises a surface protective layer formed of a material different from that of the second insulation layer and provided on the second insulation layer.

9. The liquid ejection head substrate according to claim 1, wherein the first insulation layer and the second insulation layer are formed of a same material.

10. The liquid ejection head substrate according to claim 1, wherein the layer thickness of the first insulation layer in the region uncovered with the protective layer is equal to or smaller than half of the layer thickness of the first insulation layer in the region covered with the protective layer.

11. The liquid ejection head substrate according to claim 1, wherein there is no first insulation layer in a region where the protective layer is not present.

12. A liquid ejection head comprising:

an element substrate;

a relay wiring portion electrically connected to the element substrate; and a casing internally storing a liquid to be supplied to the element substrate, the element substrate including:

a base layer;

a heating resistance element provided over the base layer to generate a heat energy for ejecting the liquid;

a first insulation layer covering the heating resistance element; and a protective layer provided on the first insulation layer, having a first region which overlaps the heating resistance element via the first insulation layer and a second region which does not overlap the heating resistance element, the protective layer is formed of a material including a metal which is eluted by an electrochemical reaction, wherein the element substrate further includes a second insulation layer provided over a region overlying the base layer and not provided with the protective layer and over the second region of the protective layer, and wherein a layer thickness of the first insulation layer in a region uncovered with the protective layer is smaller than a layer thickness of the first insulation layer in a region covered with the protective layer.

13. A method of manufacturing a liquid ejection head substrate, wherein the liquid ejection head substrate comprising: a base layer; a heating resistance element; an electrode wiring layer; a first insulation layer; a protective layer; and a second insulation layer, the method of manufacturing the liquid ejection head substrate including:

a first step of providing, over the base layer, the heating resistance element that generates a heat energy for ejecting a liquid;

a second step of stacking the first insulation layer over the heating resistance element;

a third step of stacking, over the first insulation layer, the protective layer having a first region overlapping the heating resistance element via the first insulation layer and a second region not overlapping the heating resistance element and formed of a material including a metal which is eluted by an electrochemical reaction;

a fourth step of partially removing the first insulation layer and the protective layer, so as to make a layer thickness of the first insulation layer in a region uncovered with the protective layer smaller than a layer thickness of the first insulation layer in a region covered with the protective layer; and a fifth step of stacking the second insulation layer over a region overlying the base layer where the protective layer is not provided and over at least the second region of the protective layer.

14. The method of manufacturing the liquid ejection head substrate according to claim 13, wherein the protective layer is formed of a material which does not form, as a result of being heated, an oxide film that prevents an elution.

15. The method of manufacturing the liquid ejection head substrate according to claim 13, wherein the method of manufacturing the liquid ejection head substrate further includes a sixth step of removing the second insulation layer located over the first region of the protective layer.

16. The method of manufacturing the liquid ejection head substrate according to claim 13, wherein the protective layer is formed in the first step to have a layer thickness not less than 50% of a layer thickness of the first insulation layer.

17. The method of manufacturing the liquid ejection head substrate according to claim 13, wherein in the fourth step, the first insulation layer and the protective layer are removed, so as to make the layer thickness of the first insulation layer in the region uncovered with the protective layer equal to or smaller than half of the layer thickness of the first insulation layer in the region covered with the protective layer.

18. The method of manufacturing the liquid ejection head substrate according to claim 13, wherein in the fourth step, the first insulation layer is removed, such that no first insulation layer remains wherein the protective layer is not present.

* * * * *